United States Patent
Barret et al.

(10) Patent No.: US 9,963,116 B2
(45) Date of Patent: May 8, 2018

(54) WIPING SYSTEM FOR GLAZED VEHICLE SURFACE AND METHOD FOR MANUFACTURING SAME

(71) Applicant: Valeo Systèmes d'Essuyage, Le Mesnil Saint Denis (FR)

(72) Inventors: Guillaume Barret, Laps (FR); Denis Thebault, Clermont Ferrand (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 120 days.

(21) Appl. No.: 14/921,277

(22) Filed: Oct. 23, 2015

(65) Prior Publication Data

US 2016/0114766 A1    Apr. 28, 2016

(30) Foreign Application Priority Data

Oct. 24, 2014 (FR) ..................... 14 60233

(51) Int. Cl.
  *B60S 1/40* (2006.01)
  *B60S 1/38* (2006.01)
  *B60S 1/52* (2006.01)

(52) U.S. Cl.
  CPC .......... *B60S 1/4038* (2013.01); *B60S 1/3862* (2013.01); *B60S 1/524* (2013.01); *B60S 1/3879* (2013.01)

(58) Field of Classification Search
  CPC ............................. B60S 1/3862; B60S 1/524
  USPC ..................................... 15/250.04
  See application file for complete search history.

(56) References Cited

U.S. PATENT DOCUMENTS

| | | | |
|---|---|---|---|
| 2006/0265830 A1 | 11/2006 | Walworth et al. | |
| 2008/0216274 A1* | 9/2008 | Egner-Walter | B60S 1/524 |
| | | | 15/250.02 |
| 2014/0000057 A1* | 1/2014 | Genet | B60S 1/3856 |
| | | | 15/250.32 |

FOREIGN PATENT DOCUMENTS

| | | | |
|---|---|---|---|
| DE | 102008042405 A1 | 10/2009 | |
| DE | 202010005214 U1 | 9/2010 | |
| FR | 2929907 A1 * | 10/2009 | ............. B60S 1/524 |
| GB | 555544 A * | 8/1943 | ............ B60S 1/3415 |
| WO | 2014019627 A1 | 2/2014 | |

OTHER PUBLICATIONS

FR2929907A1 (machine translation), 2009.*
DE102008042405A1 (machine translation), 2009.*
Preliminary Search Report issued in corresponding French Application No. 1460233, dated Jun. 25, 2015 (7 pages).

* cited by examiner

*Primary Examiner* — Andrew A Horton
(74) *Attorney, Agent, or Firm* — Osha Liang LLP

(57) ABSTRACT

The present invention relates to a wiping system (1; 1') for a glazed vehicle surface comprising a wiper (2) having a wiper blade (4) provided with at least one channel (6) in which a washing fluid (7) is intended to circulate, said channel (6) extending along the longitudinal axis (L) of the wiper blade (4) and emerging laterally from the wiper blade (4) through at least one spraying orifice (8), and a connector (3; 3') linked to the wiper (2) and intended to be linked to a wiper arm of a vehicle, characterized in that the connector (3; 3') has at least one opening (15; 16) formed facing at least one spraying orifice (8) of the wiper blade (4). The present invention relates also to a method for manufacturing a wiping system.

9 Claims, 2 Drawing Sheets

WIPING SYSTEM FOR GLAZED VEHICLE SURFACE AND METHOD FOR MANUFACTURING SAME

Figure 1:
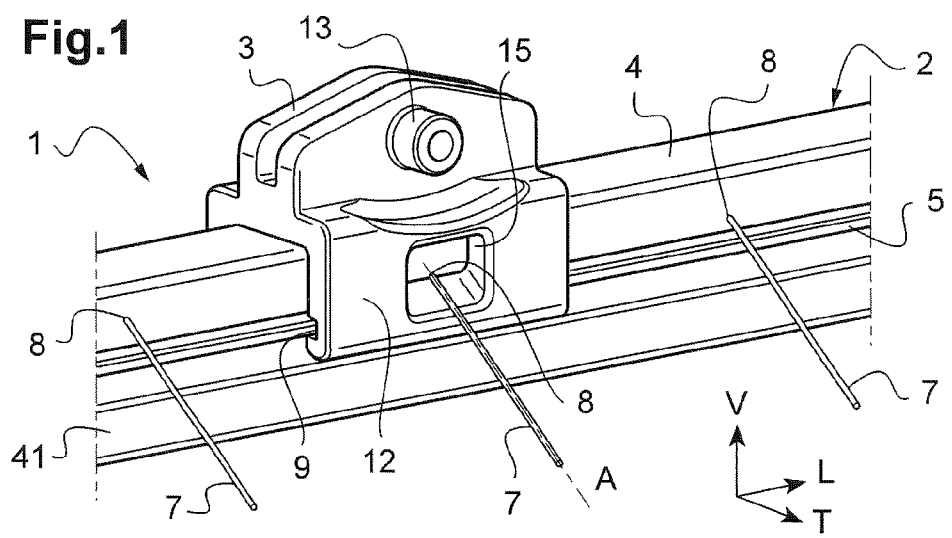

The invention relates to a wiping system for a glazed vehicle surface. The invention relates also to a method for manufacturing such a wiping system.

Motor vehicles are commonly equipped with windscreen wiper systems to ensure a sweeping and a washing of the windscreen and avoid having the view of the driver of his or her surroundings disrupted. These windscreen wipers are conventionally driven by an arm performing an angular to-and-fro movement and comprising elongate wipers which themselves bear scraping blades produced in an elastic material. These blades rub against the windscreen and dispel the water by leading it outside the field of vision of the driver. The wipers are produced in the form, either, in a conventional version, of articulated lifting beans which hold the scraping blade in several discrete locations, or, in a more recent version called FlatBlade®, by a semi-rigid assembly which holds the scraping blade over its entire length.

In this second solution, the wiper is attached to the arm rotating the windscreen wiper by a mechanical connector.

Some wiper blades are also provided with at least one washing liquid spraying boom, extending in some cases continually along the longitudinal axis of the wiper blade. The mechanical connector topping the wiper blade therefore interrupts the spraying boom. This forms a major drawback since a strip of the windscreen situated at the level of the mechanical connector is not sprinkled by the washing liquid.

The present invention aims to propose a wiping system which at least partly resolves the drawback mentioned.

To this end, the subject of the present invention is a wiping system for a glazed vehicle surface comprising:
- a wiper having a wiper blade provided with at least one channel in which a washing fluid is intended to circulate, said channel extending along the longitudinal axis of the wiper blade and emerging laterally from the wiper blade through at least one spraying orifice, and
- a connector linked to the wiper and intended to be linked to a wiper arm of a vehicle, characterized in that the connector has at least one opening formed facing at least one spraying orifice of the wiper blade.

By virtue of the opening formed facing the spraying orifice, the connector does not cover the wiper blade at the level of the spraying orifice. It is thus possible to drill all the spraying orifices in the wiper blade in the same operation, continually, with the same setting parameters, from one end to the other of the wiper blade.

According to one or more features of the wiping system taken alone or in combination,
- the opening is formed in the middle of the longitudinal dimension of a lateral face of the connector,
- the wiper blade is provided with spraying orifices formed in staggered fashion on either side of the longitudinal axis of the wiper and a single opening is formed in the connector facing a single spraying orifice of the wiper blade formed in the zone of the wiper blade topped by the connector,
- the opening is formed in an arm of a base of the connector linking the wiper,
- a portion of wall of the opening, situated on the side of the lip of the wiper blade, is inclined in relation to the direction normal to the longitudinal axis of the wiper blade,
- the inclined wall portion forms an angle of between 50° and 60° with the direction normal to the longitudinal axis of the wiper blade,
- the spraying orifice is formed by a hole of axis inclined in relation to the direction normal to the longitudinal axis of the wiper blade,
- the axis of the hole of the spraying orifice is substantially parallel to the inclination of the inclined wall portion,
- the opening has a substantially rectangular or oval or round form.

Also a subject of the invention is a method for manufacturing a wiping system as described previously, characterized in that the connector is mounted on the wiper blade, then spraying orifices are drilled along the wiper blade.

Figure 2:
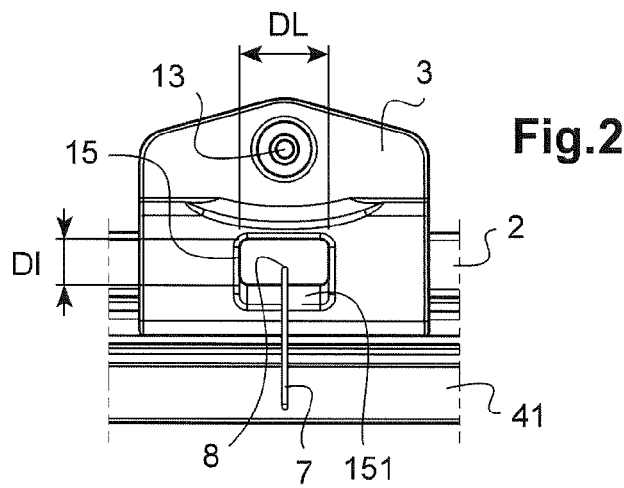
Figure 3:
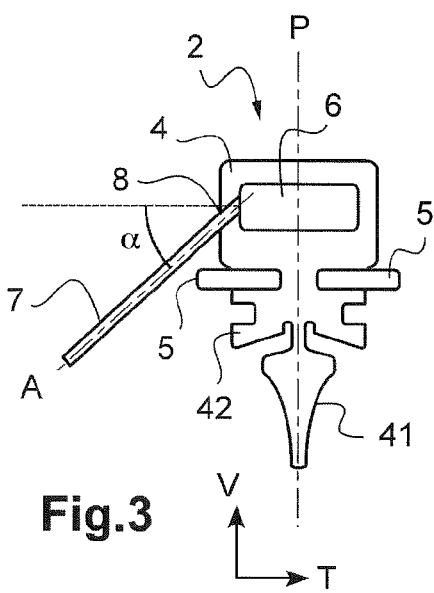
Figure 4:
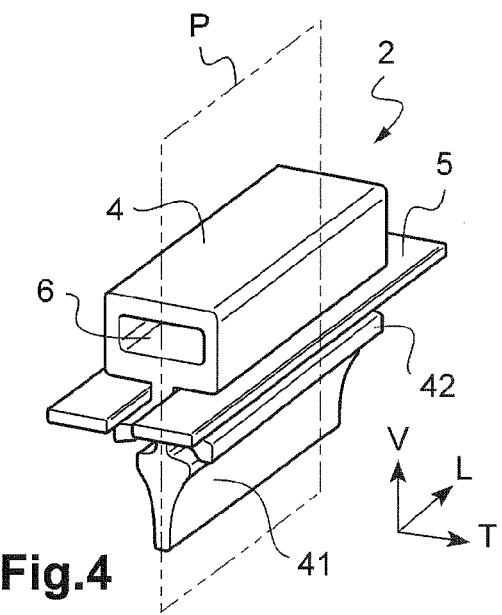
Figure 5:
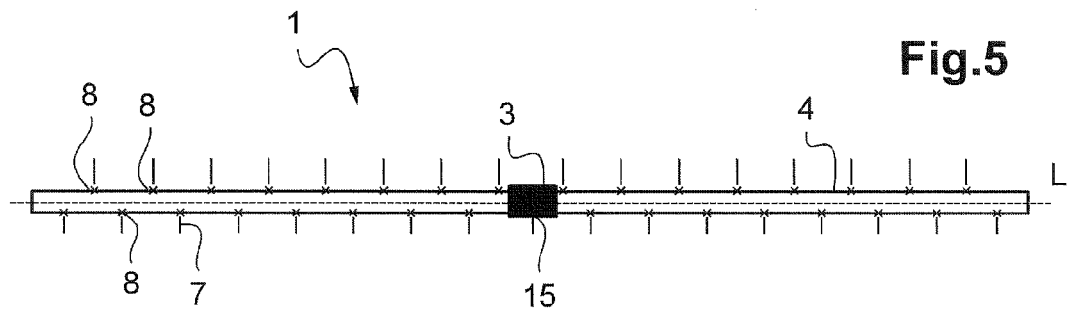
Figure 6:
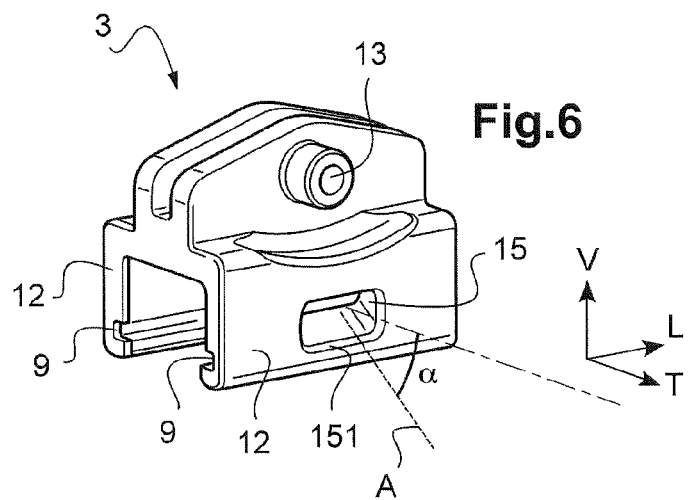
Figure 7:
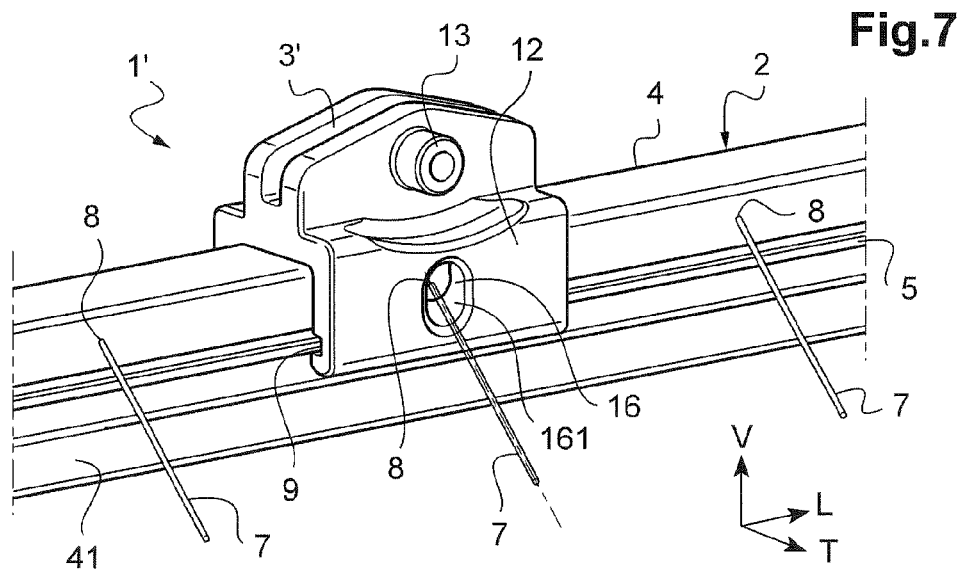

Other features and advantages of the invention will emerge from the following description, given as a non-limiting example, in light of the attached drawings in which:

FIG. 1 shows a first exemplary wiping system,

FIG. 2 shows an enlarged view of a detail of the wiping system of FIG. 1, seen from the side, FIG. 3 shows a front view of a wiper blade of the wiping system of FIG. 1, FIG. 4 shows a profile view of the wiper blade of FIG. 3, FIG. 5 is a schematic view of the wiper illustrating the staggered arrangement of the spraying orifices on the wiper blade, FIG. 6 shows a perspective view of the connector of the wiping system of FIG. 1, and FIG. 7 shows a second exemplary wiping system.

In these figures, identical elements bear the same reference numbers.

Hereinafter in the description, the longitudinal, vertical and transverse directions indicated in FIG. 1 by the trihedron (L, V, T) that is fixed relative to the wiping system 1 will be adopted in a non-limiting manner. The longitudinal direction L corresponds to the main direction of the wiper blade. The transverse direction T and the vertical direction V are at right angles to one another and to the longitudinal direction L.

FIGS. 1 and 2 represent a wiping system 1 for a glazed vehicle surface, such as the rear window.

The wiping system 1 comprises a wiper 2 and a connector 3. The windscreen wiper 2 comprises a wiper blade 4 and a flexible structure 5. The wiper blade 4 extends in the longitudinal direction L. The connector 3 is linked to the wiper blade 4 at the centre of the blade 4 (FIG. 5). The wiper blade 4 and the connector 3 have a longitudinal plane of symmetry P.

As can be seen more clearly in FIGS. 3 and 4, the wiper blade 4 comprises a lip 41 intended to scrape a glazed surface, and a heel 42 (or damper) forming the interface between the lip 41 and the flexible structure 5. Through their respective functions, the lip 41 is particularly hard and wear-resistant, whereas the heel 42 offers the flexibility needed for optimal reversal of the blade 4, when the sweep directions are reversed, the flexibility resulting notably from the particular cut of the heel 42.

The blade 4 is thus formed by a profile for example made of elastomer which combines in a single piece assembly, both the lip 41 and the heel 42. At rest, the wiper blade 4 exhibits a longitudinal plane of symmetry P.

The flexible structure 5 comprises two elastically deformable tongues which are incorporated longitudinally, respectively on the opposite lateral faces of the blade 4. Each tongue, commonly called spine, is responsible for distributing the bearing pressure uniformly over the entire length of the blade 4 in order to optimize the wiping quality. They are for example made of metal. According to an exemplary embodiment, the wiper blade 4 is provided with two longitudinally and laterally open slits, receiving a respective spine.

The wiper 2 also comprises end fittings (not represented), for example threaded onto the longitudinal ends of the wiper blade 4, mechanically connecting together the blade 4 with the spines of the flexible structure 5, by pinching them.

The wiper blade 4 is further provided with at least one channel 6 in which a washing fluid 7 is intended to circulate. The channel 6 is formed in the heel 42 of the wiper blade 4. It extends along the longitudinal axis L of the wiper blade 4 and emerges laterally from the wiper blade 4 through at least one spraying orifice 8.

The cross section of the channel 6 is for example substantially rectangular.

The channel 6 is intended to be supplied with washing fluid 7 at one end of the wiper blade 4 through the end fitting.

According to an exemplary embodiment, the channel 6 emerges from the wiper blade through a plurality of spraying orifices 8. The spraying orifices 8 are for example distributed along the longitudinal axis L, thus forming a sprinkling boom. The spacing between the spraying orifices 8 is for example constant.

Provision can also be made for at least one spraying orifice 8 to be formed on either side of the longitudinal axis L of the wiper 2, to spray the washing fluid 7 respectively on either side of the axis L, for example for the washing fluid 7 to be sprayed only in front of the wiper blade 4 during upward and downward phases of the sweep.

The spraying orifices 8 are for example arranged in staggered fashion on the wiper blade 4 (FIG. 5).

The connector 3 is linked on the one hand to the wiper blade 4 and on the other hand to a wiper arm of a vehicle (not represented) for it to be driven pivot-wise.

More specifically, the connector 3 is secured to the wiper blade 2. For that, the base of the connector 3 comprises, for example, at least one cut 9, for example two, opposite one another, and formed in a respective arm 12 of the connector 3 delimiting the base. The arms 12 extend in the vertical direction V. The cuts 9 thus form hooks, having a form corresponding to the part of the heel 42 in which the channel 6 is formed. The hooks are thus able to grip on the wiper 2, and more particularly on the spines of the flexible structure 5 of the wiper 2 (FIGS. 1 and 5). In the assembled state, the connector 3 thus tops the wiper blade 2.

The connector 3 is also intended to be linked mechanically to the wiper arm, for example via an adapter, for example by pivot link. For that, the connector 3 comprises, for example, one or two aligned pins 13, topping the base. The pins 13, cylindrical, protrude in the transverse direction, to cooperate by pivoting with the actuation arm or an adapter thereof. The connector 3 thus makes it possible to mechanically link the arm to a wiper 2 of flat type, the pivot link making it possible to implement a rotation of the wiper 2 in relation to the arm.

The connector 3 further has at least one opening 15 formed facing at least one spraying orifice 8 of the wiper blade 4.

The connector 3 described above is advantageously produced in a single piece, for example obtained by moulding.

During manufacture, the connector 3 is mounted on the wiper blade 4.

Then, spraying orifices 8 are drilled, for example by laser, along the wiper blade 4.

By virtue of the opening 15 formed facing the spraying orifice 8, the connector 3 does not cover the wiper blade 4 at the level of the spraying orifice 8. It is thus possible to drill all the spraying orifices 8 in the wiper blade 4 by the same operation, continually, with the same setting parameters, from one end to the other of the wiper blade 4.

The opening 15 is for example formed in the middle of the longitudinal dimension of a lateral face of the connector 3.

The opening 15 is for example formed in the lateral face of an arm 12 of the base of the connector 3 linking the wiper 2.

In the case where at least one spraying orifice 8 is formed on either side of the longitudinal axis L of the wiper 2, provision can be made for a corresponding opening 15 to be formed on each side of the connector 3, facing the at least one spraying orifice 8 of the wiper blade 4 (not represented).

In the case where the wiper blade is provided with spraying orifices formed in staggered fashion on either side of the longitudinal axis L of the wiper 2, provision can be made for a single opening 15 to be formed in the connector 3 facing the single spraying orifice 8 of the wiper blade 4 formed in the zone of the wiper blade topped by the connector 3 (FIG. 5).

The staggered arrangement of the spraying orifices 8 makes it possible to form a single opening 15, if it is formed in the middle of the longitudinal dimension of the lateral face of the connector 3.

According to a first embodiment represented in FIGS. 1, 2 and 6, the opening 15 has a substantially rectangular form, on the inside, against the wiper blade 4. The opening 15 has, for example, a length DL of the order of 6 millimeters and a width DI of the order of 3 millimeters.

A portion of wall 151 of the opening 15, situated at the bottom, on the side of the lip 41 of the wiper blade 4, can be inclined in relation to the transverse direction T of the wiper blade, that is to say in relation to the direction normal to the wiper blade 4. The rectangular opening 15 thus flares out downwards.

The inclined wall portion 151 forms, for example, an angle α of between 50° and 60° with the transverse direction T, such as of the order of 55°.

In the case of an opening of substantially rectangular form and referring to FIG. 6, the inclined wall 151 extends longitudinally, forming the bottom internal side of the opening 15.

Provision can also be made for the spraying orifice 8 to be formed by a hole of axis A that is inclined in relation to the transverse direction T.

The axis of the hole A of the spraying orifice 8 forms, for example, an angle α of between 50° and 60° with the transverse direction T, such as of the order of 55°.

The axis of the hole A of the spraying orifice 8 is for example substantially parallel to the inclination of the inclined wall portion 151. Contact between the fluid and the wall of the connector is thus avoided.

FIG. 6 shows a second exemplary wiping system 1'.

The wiping system 1' differs from the one described previously by the oval form of the opening 16.

The opening 16 here has a substantially circular form, on the inside, against the wiper blade 4.

A portion of wall 161 of the opening 16, situated at the bottom, on the side of the lip 41 of the wiper blade 4, can be inclined in relation to the transverse direction T of the wiper blade, that is to say in relation to the direction normal to the longitudinal axis L of the wiper blade 4. The circular opening 16 thus flares out downwards, forming, on the outside, a substantially oblong form.

The inclined wall portion 161 forms, for example, an angle α of between 50° and 60° with the transverse direction T, such as of the order of 55°.

As previously, provision can also be made for the spraying orifice 8 to be formed by a hole of axis A that is inclined in relation to the transverse direction T. The axis of the hole A of the spraying orifice 8 forms, for example, an angle α of between 50° and 60° with the transverse direction T, such as of the order of 55°. The axis of the hole A of the spraying orifice 8 is for example substantially parallel to the inclination of the inclined wall portion 161.

The invention claimed is:

1. A wiping system for a glazed vehicle surface comprising:
   a wiper having a wiper blade provided with at least one channel in which a washing fluid circulates, said channel extending along a longitudinal axis of the wiper blade and emerging laterally from the wiper blade through at least one spraying orifice; and
   a connector linked to the wiper and configured to be linked to a wiper arm of a vehicle,
   wherein the connector has at least one opening, wherein one of the at least one spraying orifice of the wiper blade is positioned within one of the at least one opening, and wherein the connector does not block the one of the at least one spraying orifice within the one of the at least one opening.

2. The wiping system according to claim 1, wherein the at least one opening is formed in the middle of the longitudinal dimension of a lateral face of the connector.

3. The wiping system according to claim 1, wherein the wiper blade is provided with the at least one spraying orifice formed in staggered fashion on either side of the longitudinal axis of the wiper and one of the at least one opening is formed in the connector facing a corresponding one of the at least one spraying orifice of the wiper blade formed in a zone of the wiper blade topped by the connector.

4. The wiping system according to claim 1, wherein the at least one opening is formed in an arm of a base of the connector linking the wiper.

5. The wiping system according to claim 1, wherein a portion of a wall of the opening, situated on a side of a lip of the wiper blade, is inclined in relation to a direction normal to the longitudinal axis of the wiper blade.

6. The wiping system according to claim 5, wherein the inclined wall portion forms an angle of between 50° and 60° with the direction normal to the longitudinal axis of the wiper blade.

7. The wiping system according to claim 5, wherein the at least one spraying orifice is formed by a hole on an axis inclined in relation to the direction normal to the longitudinal axis of the wiper blade.

8. The wiping system according to claim 7, wherein the axis of the hole of the at least one spraying orifice is substantially parallel to the inclination of the inclined wall portion.

9. The wiping system according to claim 1, wherein the at least one opening has a substantially rectangular, oval, or round form.

* * * * *